June 4, 1940.                  E. C. WHITE                    2,203,245
                            MOTION DISPLAY DEVICE
                        Filed Aug. 19, 1939         2 Sheets-Sheet 1
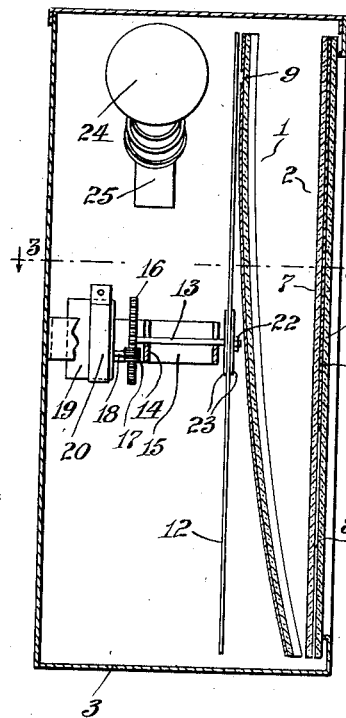
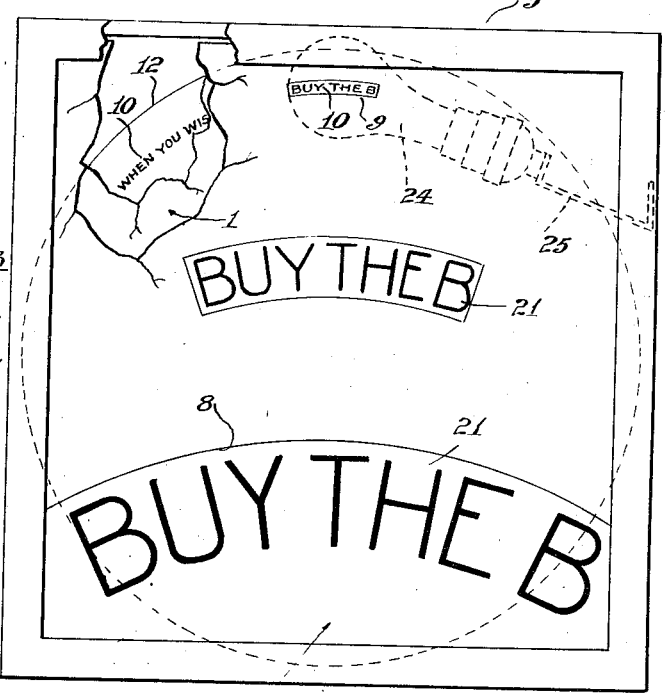
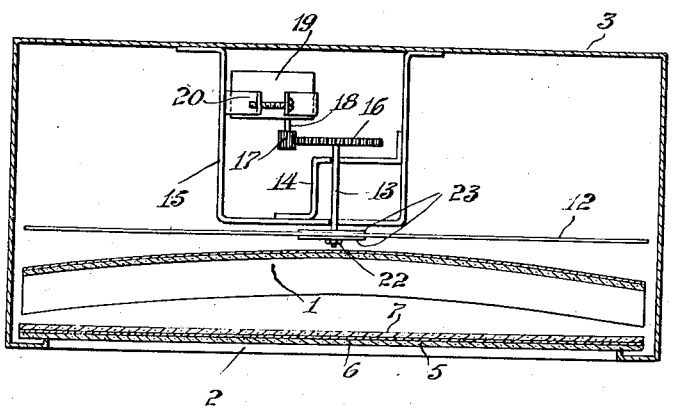
INVENTOR
Ernest Cantelo White
BY
ATTORNEY June 4, 1940.　　　　E. C. WHITE　　　　2,203,245
MOTION DISPLAY DEVICE
Filed Aug. 19, 1939　　　2 Sheets-Sheet 2

INVENTOR
Ernest Cantelo White
BY
ATTORNEY

Patented June 4, 1940

2,203,245

UNITED STATES PATENT OFFICE 2,203,245

MOTION DISPLAY DEVICE

Ernest Cantelo White, Bronxville, N. Y., assignor to Multi Vue Signs Company, Incorporated, New York, N. Y., a corporation of New York Application August 19, 1939, Serial No. 290,955

19 Claims. (Cl. 40—34)

The present invention relates to attention-compelling devices in general, and more particularly to a form of traveling signs.

One of the objects of the invention is the provision of a sign having its main interest-compelling feature consist of producing multiple reflections of running indicia which characterizes the sign as of the traveling type.

Another object of the invention is the utilization of moving indicia which is multireflected in such a manner that the images are duplicated in sets or rows.

Another object is the provision of means for magnifying some of the moving images so that a given amount of indicia of a certain size may be shown by unusually compact and inexpensive apparatus.

Another object is to provide multiplied animation of the indicia with stationary mirrors.

Another object of the invention is to provide animated display in which changes of indicia may be made cheaply and conveniently and without the risk of breakage.

A further object is to so improve the means for producing multiple images that greatly increased brightness of some of the images is obtained.

Other objects, advantages and features of construction in combination of means and details will be made manifest from the following specification, it being understood that modifications, variations and adaptations may be resorted to without departing from the spirit and scope of the invention as hereinafter claimed.

The motion display apparatus which I have chosen to illustrate, which may be regarded as the preferred embodiment of the invention, comprises a mirror system capable of producing multiple images such as disclosed by United States Patent 1,202,593 issued to W. McI. Scott on October 24, 1916. Briefly, this comprises a system of stationary mirrors including a front transparent mirror and a rear opaque mirror, said mirrors having opposed reflecting surfaces. According to the present illustration I may employ a flat front transparent mirror and a spherically concave rear opaque mirror, which is inclined rearwardly at an acute angle to the front mirror.

The means for providing moving indicia may take the form of a rotatable non-shatterable transparent or translucent disc having indicia marginally arranged thereon, closely spaced and small enough so that a considerable message may be composed within the marginal space occupied by the indicia.

A motor with suitable gear ratio is provided for rotating the disc carrying the indicia, and it is positioned immediately behind the opaque mirror. An arcuate shaped window, in registration with a section of the indicia, is formed on the opaque mirror by removing a corresponding portion of the coating thereof, and as the disc revolves, the moving multiple reflections of the indicia are progressively enlarged and appear in duplicate sets or rows. A portion of the coating of the transparent mirror is removed along the bottom edge to give a clearer view of the line of reflected images appearing in that region. Since the reading or visible portion of the indicia is concentrated within a small fixed space defined by the window, any desired intensity of illumination may be obtained by the expenditure of a comparatively small amount of electrical energy.

It is obvious that the utilization of moving multiple reflections, which are produced and enlarged by the combination of a curved mirror inclined at an acute angle to a flat straight mirror make it possible to use small indicia which lends itself to the use of a very simple, compact mechanism for translating the movement of the indicia into a running message visible from the front of the sign in separate lines of progressively different sizes. By making the disc of a light transparent or translucent non-shatterable material and mounting it on a removable arbor that may be easily lifted out of its bearings, frequent changes of the indicia or copy may be made at small cost.

Referring to the accompanying drawings:

Fig. 1 is a vertical section of a motion display device embodying the invention;

Fig. 2 is a front elevation, partly broken away, of the device shown in Fig. 1;

Fig. 3 is a horizontal section taken on the line 3—3 of Fig. 1;

Figure 4:
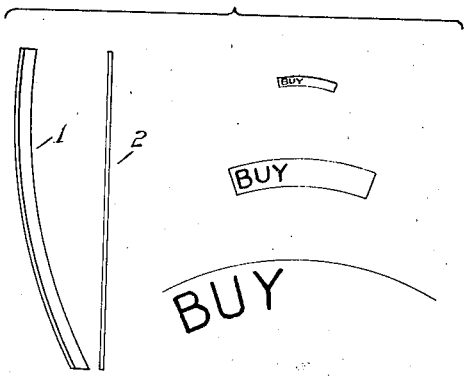
Fig. 4 is a schematic view of the combination of a straight front transparent mirror and a spherical concave rear opaque mirror inclined at an acute angle to the front mirror and showing the character of reflected images produced by such a mirror system.

Although my invention is susceptible to many adaptations, for the purpose of illustration I have selected a simplified construction of a multiple image sign embodying fixed mirrors. These mirrors may be of several types and combined in a number of different ways, but for the sake of illustration it will be assumed that the present mirror system comprises a spherical concave rear mirror 1 and a flat front transparent mirror 2. Other combinations of mirrors will be described hereinafter for producing particular desired effects.

The mirrors 1 and 2 are spaced apart and fixed in position within a casing 3, the open front of which is closed by the transparent mirror 2. As is well known in the art, the transparent mirror comprises a sheet of glass 5 having a thin coating 6 of silver on its rear face, which coating is sufficiently thin to transmit light, but provides a good reflecting surface for a brighter light. To protect the silver coating on the transparent mirror, it is covered with a sheet of glass 7, the glass and mirror usually being bound together, around their marginal edges, with thin adhesive tape (not shown), thus uniting the same into a unitary element. In the present case the reflecting coating 6 is removed from the transparent mirror along the lower edge, forming a clear portion 8, having an arcuated top conforming to a row of images which will be hereinafter described.

A window 9 is formed near the marginal edge of the mirror 1 by removing a portion of the coating on the back of said mirror, the configuration of the window being arcuate and of such a dimension as to be slightly greater in height than that of indicia intended to be visible therethrough; as to width, the opening 9 is restricted to include merely a portion of the moving indicia sufficient to make the message or advertisement readable without difficulty. The indicia 10 formed on a disc 12 is cooperatively positioned with respect to the mirror 1 so that the window 9 and the indicia 10 are in registration, and these two elements are in close proximity to each other.

The disc 12 is carried on the end of an arbor 13, loosely supported in U-shaped grooves formed in a bracket 14, which comprises a part of a frame 15, the latter being suitably secured to the side of the casing 3, as by spot welding. The inner end of the arbor 13 is provided with gear wheel 16 which engages a pinion 17, mounted upon a laterally extending pin 18 which may be driven by a gear train (not shown) forming part of the motor 19. The motor 19 may be fastened in a spring clamp 20, attached to the frame 15. By this means the disc 12 may be rotated at any desired speed, and the indicia 10, as it passes behind the window 9, will be visible therethrough as a traveling sign or message, and the multiple reflections 21 thereof, produced by the mirrors 1 and 2, will be progressively enlarged from top to bottom and appear in separate rows or lines moving across the transparent mirror 2 in unison with the passing indicia.

The disc 12 may be made of any thin translucent or transparent, preferably non-shatterable material such as plastic, fibre, paper, or the like, and the indicia 10 painted or printed thereon and preferably located near the marginal edge so as to afford a greater radius and consequent greater circle within which the indicia may be formed. By having the indicia of small type or character, a considerable message may be composed within the space occupied by the indicia.

The invention contemplates that the disc 12 be easily removable, which in the present instance may be done by merely lifting the arbor 13 out of its U-shaped bearings. The disc 12 may then be replaced by removing the nut 22 which holds the disc between two face plates or washers 23, and substituting another disc, which is then secured in place by replacing the nut 22 and inserting the arbor 13 back into position. This construction lends itself to a quick and ready change of indicia which may be an important factor in certain types of motion display apparatus.

By providing the clear portion 8 along the bottom edge of the transparent mirror 2 the last line of images, greatly magnified, may be seen without looking through the transparent mirror, and therefore this row of images appears brighter than it would otherwise be if viewed through the transparent mirror. It is therefore obvious that I have provided a simple expedient for improving or tending to equalize the brilliancy of the images as they are repeated in magnified form. It is easily appreciated by those skilled in the art that this arrangement could be carried out in step-by-step form so that several portions of the transparent mirror 2, which are not needed to produce the reflected images visible from a given point of observation, could be left clear and provide a brighter view of reflected images which are dimmed in proportion to their enlargement.

For the purpose of illuminating the indicia 10, I provide an electric lamp 24, which may be mounted behind the disc 12 in any suitable fashion, as for example, by a bracket 25. It is obvious that since the only part of the indicia that need be illuminated at one time is that immediately behind the aperture 9. By focusing the light on that portion of the apparatus, great brilliancy may be obtained at the expense of very little electrical energy. This is also made feasible by the fact that the lowermost line of the images 21 is viewed through the clear portion of the transparent mirror 2, and consequently there is no loss or diminution of light by the transmission of these images through the coating of the transparent mirror.

Referring to modifications of the mirror system for producing different arrangements or formations of the indicia, attention is directed to Figs. 4 to 7. In Fig. 4 it will be noted that the arrangement of the mirrors is that just described, i. e., there is shown a straight front transparent mirror 2 and a spherical concave rear mirror 1, inclined at an acute angle to the transparent mirror 2 which causes progressive enlargements of the images both in height and width, in the order of their successive repetition in lines or rows. The space between the lines, as well as the magnification of the images, is very pronounced, and this mirror system is admirably adapted for display devices which may be viewed either close up or at considerable distance.

Figure 5:
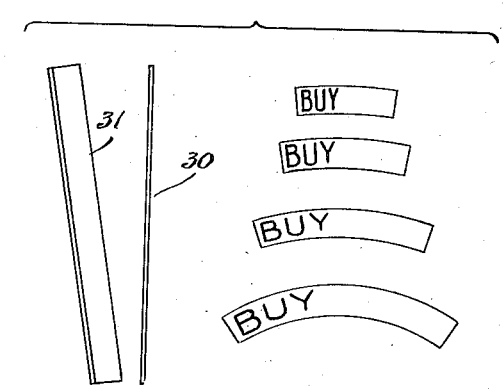
Fig. 5 is a similar view of the combination of a straight front transparent mirror and a cylindrical rear opaque mirror on an inclined vertical axis.

In Fig. 5 there is shown a combination of a straight front transparent mirror 30 and a rear opaque mirror 31 made cylindrical about a vertical axis and inclined at an angle to the front mirror 30. By this system of mirrors the reflections are only enlarged in width.

Figure 6:
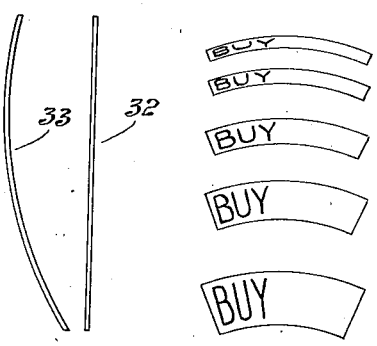
Fig. 6 is also a similar view of the combination of a straight front transparent mirror and a cylindrical rear opaque mirror on a horizontal axis.

In Fig. 6 there is illustrated the combination of a straight front transparent mirror 32 and a rear opaque mirror 33 made cylindrical about a horizontal axis and inclined at an angle to the front mirror 32. By this arrangement of mirrors, the indicia 21 is maintained uniform in width, but is magnified in height in the several progressive multiplications of the images.

Figure 7:
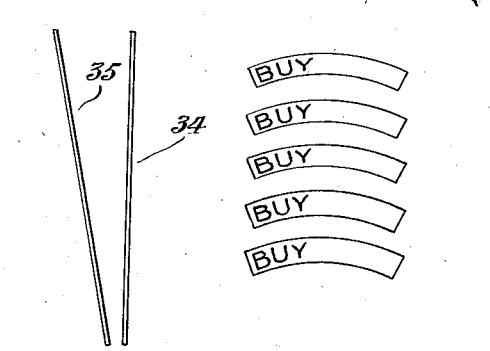
Fig. 7 is a like view of the combination of a staight front transparent mirror and a flat rear opaque mirror inclined vertically.

In Fig. 7, where there is employed the combination of a straight front transparent mirror 34 and a flat rear opaque mirror 35 inclined vertically, there is no magnification of the images, the same merely being repeated in several lines.

From the foregoing it will be seen that the motion display device contemplated by me has as its principal characteristic the utilization of movable indicia and means for causing a periodic motion of said indicia with relation to a mirror system capable of producing multiple reflections which may be progressively enlarged. Obviously, many modifications of the structure and/or arrangement of the component parts thereof will suggest themselves to those skilled in the art, but it is my desire to cover all such modifications as come within the scope of the appended claims.

What is claimed is:

1. In motion display apparatus, the combination with a fixed mirror system, of traveling indicia, said mirrors being adapted to produce multiple reflections of said indicia, and means for enlarging said multiple reflections.

2. In a sign of the class described, a support, a mirror system comprising a front mirror and a rear mirror carried in fixed position by the support, said mirrors having opposed reflecting surfaces, indicia associated with the said mirror system and capable of being multireflected by the cooperative effect of said mirrors, and means for causing a periodic motion of said indicia with relation to said mirror system.

3. In a sign of the class described, a support, a mirror system comprising a front mirror and a rear mirror carried in fixed position by the support, said mirrors having opposed reflecting surfaces, indicia associated with the said mirror system and capable of being multireflected by the cooperative effect of said mirrors, means for illuminating said indicia, and means for causing a periodic motion of said indicia with relation to said mirror system.

4. In a sign of the class described, a support, a mirror system comprising a front mirror having a clear portion and a rear mirror carried in fixed position by the support, said mirrors having opposed reflecting surfaces, indicia associated with the said mirror system and capable of being multireflected by the cooperative effect of said mirrors, and means for causing a periodic motion of said indicia with relation to said mirror system.

5. In a sign of the class described, a support, a mirror system comprising a front transparent mirror and a rear mirror carried by the support, said mirrors having opposed reflecting surfaces, indicia associated with the said mirror system and capable of being multireflected by the cooperative effect of said mirrors, and means for causing a periodic motion of said indicia with relation to said mirror system.

6. In a sign of the class described, a support, a mirror system comprising a front mirror and a rear mirror carried in fixed position by the support, said mirrors having opposed reflecting surfaces, indicia associated with the said mirror system and capable of being multireflected by the cooperative effect of said mirrors, said rear mirror having a window cooperatively positioned with respect to the indicia, and means for causing a periodic motion of said indicia with relation to said mirror system.

7. In a sign of the class described, a support, a mirror system comprising a front mirror and a rear mirror carried in fixed position by the support, said mirrors having opposed reflecting surfaces, indicia associated with the said mirror system and capable of being multireflected by the cooperative effect of said mirrors, and means for rotating the said indicia with respect to said mirror system.

8. In a sign of the class described, a support, a mirror system comprising a front mirror and a rear mirror carried in fixed position by the support, said mirrors having opposed reflecting surfaces, one of said mirrors being curved and inclined at an acute angle to the other mirror, indicia associated with the said mirror system and capable of being multireflected by the cooperative effect of said mirrors, and means for causing a periodic motion of said indicia with relation to said mirror system.

9. In a sign of the class described, a support, a front transparent mirror and a rear opaque mirror carried by the support, said mirrors being stationary and having opposed reflecting surfaces, said opaque mirror being curved and inclined to the vertical, a separate rotatable disc having indicia carried thereon and cooperatively positioned with respect to a window formed in the coating of the opaque mirror.

10. In a sign of the class described, a support, a front transparent mirror and a rear opaque mirror carried in fixed position by the support, said mirrors having opposed reflecting surfaces, indicia associated with said mirror system and capable of being multireflected by the cooperative effect of said mirrors, means for causing the multiple images to appear in progressively different sizes, and means for periodically moving the indicia with relation to the mirror system.

11. In a sign of the class described, a fixed mirror system capable of producing multiple reflections of indicia associated therewith, said indicia being adapted to move with respect to said mirror system, and means for creating progressively enlarged multiple images of said indicia and causing said images to appear in groups composed of the same order of magnifications.

12. In a sign of the class described, a support, a front transparent mirror and a rear opaque mirror carried by the support, said mirrors being stationary and having opposed reflecting surfaces, indicia associated with the said mirror system and capable of being multi multireflected by the cooperative effect of said mirrors, means for causing a periodic motion of said indicia with respect to said mirror system, and means for producing progressive enlargements of said multiple images.

13. In a sign of the class described, a support, a mirror system comprising a front mirror and a rear mirror carried by the support, said mirrors having opposed reflecting surfaces, an independently rotatable disc having indicia carried thereon and cooperatively positioned with respect to a window formed in the coating of the rear mirror.

14. In motion display apparatus, a mirror system adapted to produce multiple images and including a rear opaque mirror having a marginal cut-out panel, a separate rotatable disc having running indicia formed concentrically thereon, and means for rotating said disc, said indicia and panel being in substantial registration with respect to height and the rotation of the disc causing the images to travel in the direction the indicia passes said panel.

15. The combination as claimed in claim 14 wherein the disc is made of translucent non-shatterable material.

16. The combination as claimed in claim 14 wherein the disc is removably mounted, whereby it may be replaced easily.

17. In a sign of the class described, a casing, a straight front transparent mirror and a curved rear opaque mirror supported in said casing, said mirrors being stationary and having opposed reflecting surfaces, an independently rotatable disc carrying indicia thereon and cooperatively positioned with respect to a window formed in the coating of the opaque mirror, and means for rotating said disc, said indicia being marginally arranged on said disc and sufficiently small to register with said window and appear as a running message when moved therebehind, said opaque mirror being spherical and inclined to the vertical, whereby the moving multiple reflections of said indicia are progressively enlarged and appear in separate duplicate bands.

18. In a sign of the class described, a casing, a straight front transparent mirror and a curved rear opaque mirror supported in fixed position within said casing, said mirrors having opposed reflecting surfaces, said opaque mirror being inclined to the vertical, said transparent mirror having a portion of its coating removed to afford a brighter view of a portion of reflected images, a rotatable disc provided with small indicia closely spaced and concentrically arranged, said indicia being cooperatively positioned with respect to a window formed in the coating of said opaque mirror, means for rotating said disc so that the indicia is presented to the window as a traveling message visible piecemeal, and means for illuminating the indicia.

19. The combination as claimed in claim 18 wherein the curved opaque mirror is spherically convex.

ERNEST CANTELO WHITE.